No. 882,060. PATENTED MAR. 17, 1908.
G. G. GLENN.
MACHINE FOR RESHAPING BOTTLE CAPS.
APPLICATION FILED APR. 11, 1907.
4 SHEETS—SHEET 3.
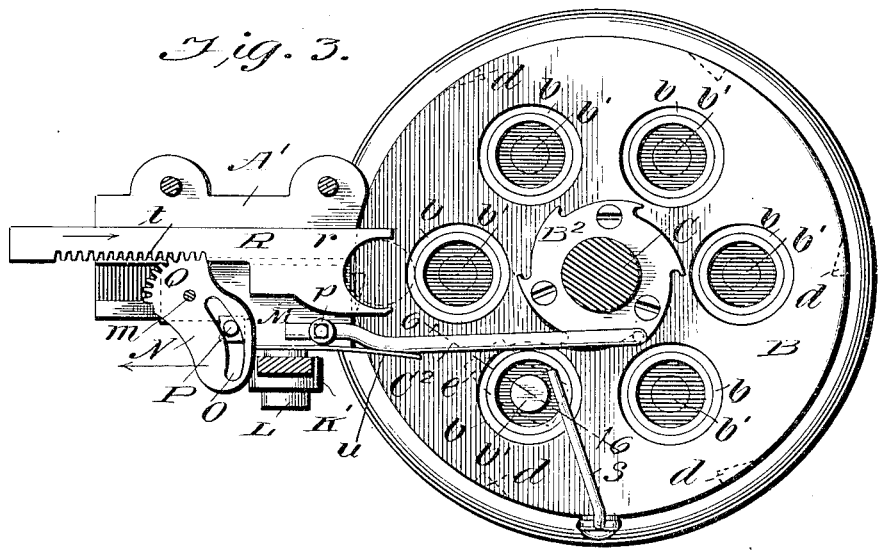
Fig. 3.
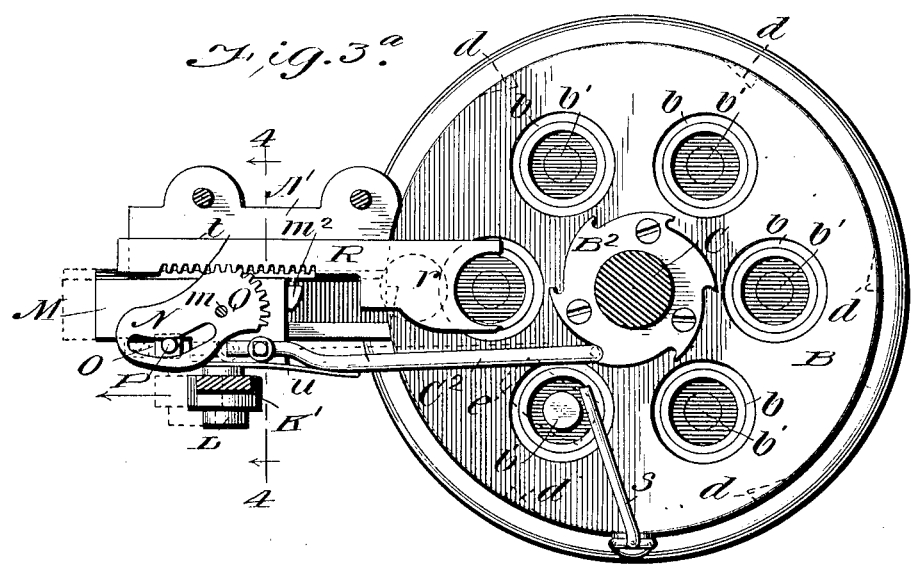
Fig. 3ª.
WITNESSES
F. C. Barry
Edw. W. Byrn.
INVENTOR
GEORGE G. GLENN
BY Munn & Co.
ATTORNEYS No. 882,060. PATENTED MAR. 17, 1908.
G. G. GLENN.
MACHINE FOR RESHAPING BOTTLE CAPS.
APPLICATION FILED APR. 11, 1907.

4 SHEETS—SHEET 4.

WITNESSES
F. C. Barry
Edw. W. Byrn.

INVENTOR
GEORGE G. GLENN
BY Munn & Co.
ATTORNEYS

UNITED STATES PATENT OFFICE.

GEORGE G. GLENN, OF GASTONIA, NORTH CAROLINA.

MACHINE FOR RESHAPING BOTTLE-CAPS.

No. 882,060.      Specification of Letters Patent.      Patented March 17, 1908.

Application filed April 11, 1907. Serial No. 367,579.

*To all whom it may concern:*

Be it known that I, GEORGE G. GLENN, a citizen of the United States, residing at Gastonia, in the county of Gaston and State of North Carolina, have invented a new and useful Improvement in Machines for Reshaping Bottle-Caps, of which the following is a specification.

Figure 1:
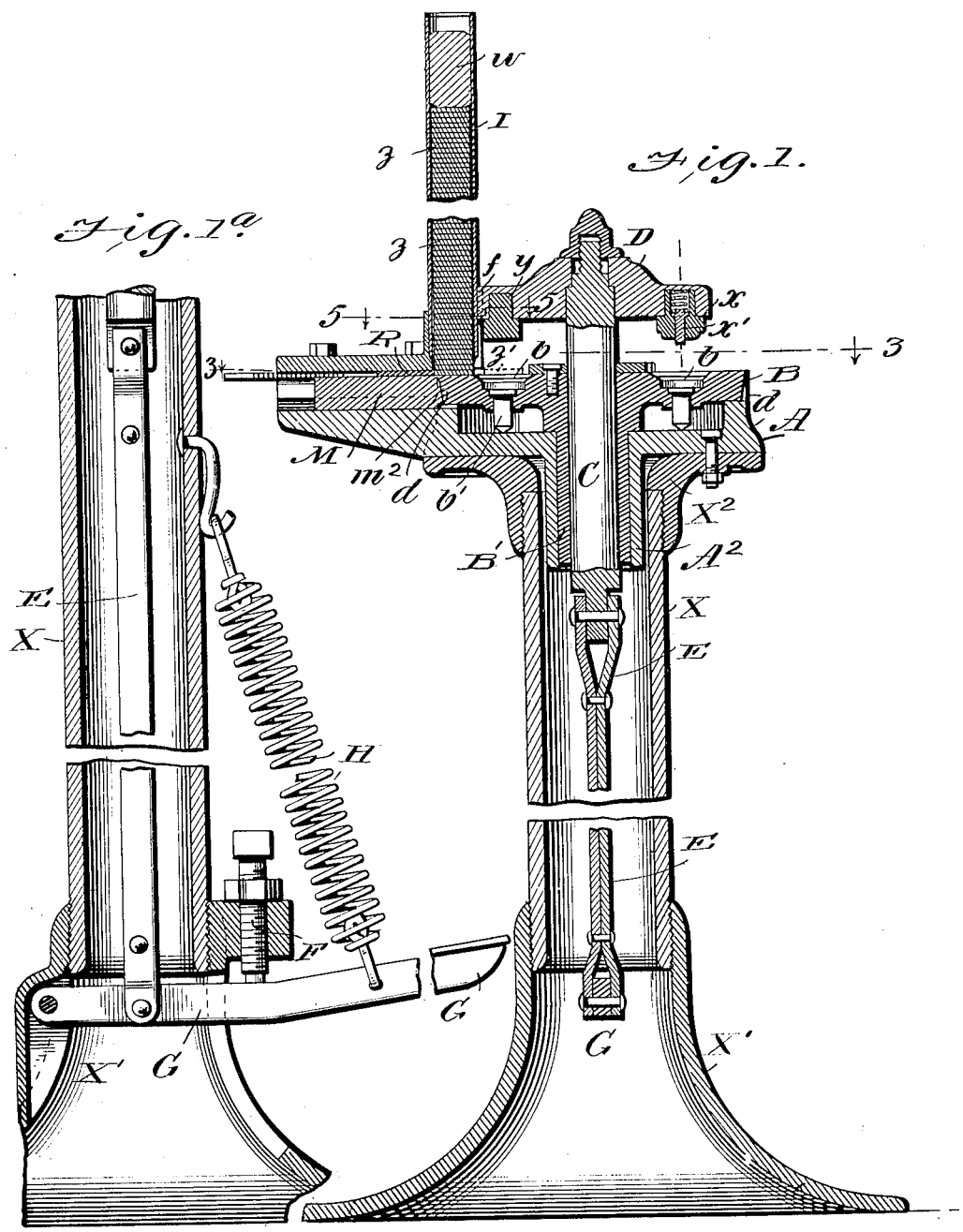
Figure 2:
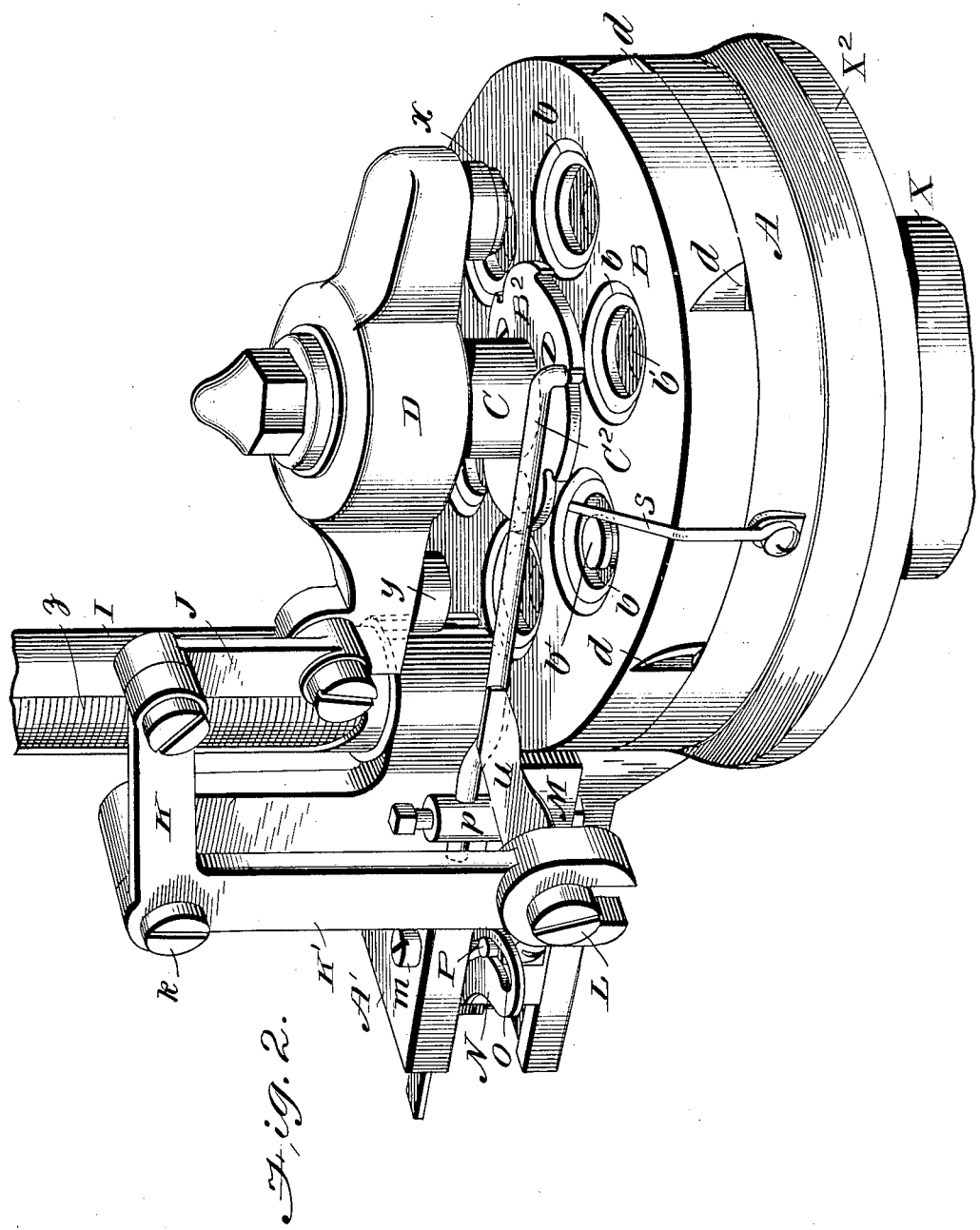
Figure 4:
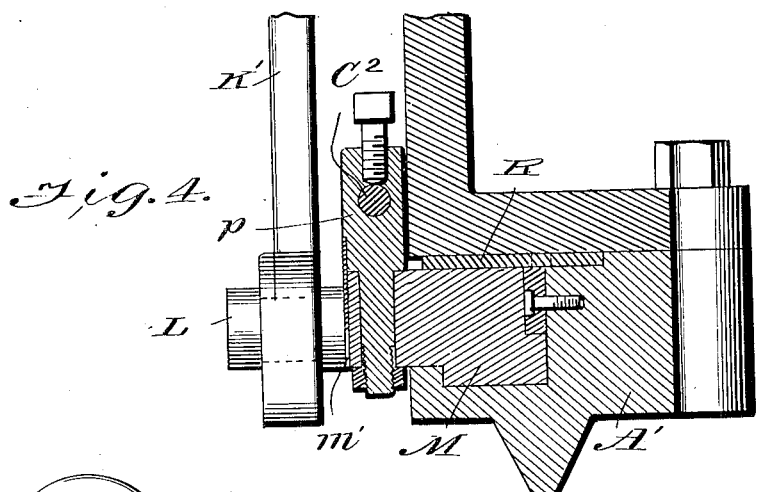
Figure 5:
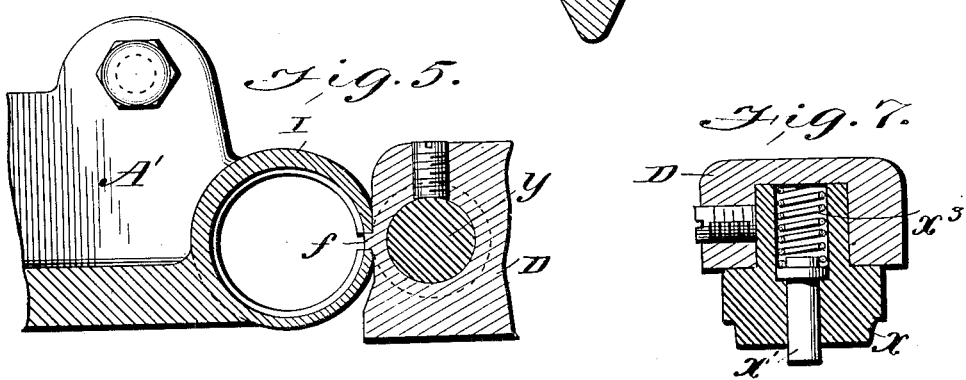
Figure 7:
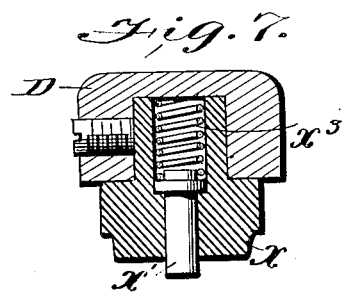
Figure 6:
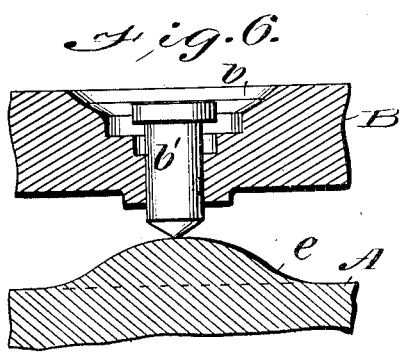
Figure 8:
Figure 9:
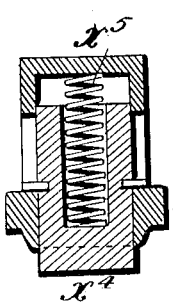

The object of my invention is to provide a simple and practical machine for repairing previously used metal caps for bottles by re-shaping them and at the same time inserting new cork disks therein, and it consists in the novel construction and arrangement of the machine, which I will now proceed to describe with reference to the drawings, in which Figure 1 is a vertical central section with the pedestal and magazine broken away. Fig. 1$^a$ is an enlarged sectional view of the lower part of the pedestal taken at right angles to Fig. 1. Fig. 2 is an enlarged perspective view of the upper portion of the machine. Fig. 3 is a horizontal section on line 3—3 of Fig. 1. Fig. 3$^a$ is the same view as Fig. 3, but showing a different position of parts. Fig. 4 is an enlarged sectional detail on line 4—4 of Fig. 3$^a$. Fig. 5 is an enlarged sectional detail on line 5—5 of Fig. 1. Fig. 6 is an enlarged sectional detail on line 6—6 of Fig. 3 and Figs. 7, 8 and 9 are sectional details of various forms of dies.

In the drawing, Fig. 1, X is a hollow column having a spreading base X' and a spreading top X$^2$ forming a pedestal frame on top of which is bolted a bed A recessed in the middle and having a raised outer edge.

G is a treadle normally held up by spring H and arranged to pull down a rod E and having a stop screw F for limiting the rise of the treadle. The pull rod E is attached to a vertically reciprocating plunger stem C sliding in a sleeve B' of a turn-table B. The turn-table rotates on the raised edges of the bed A and this bed has a stationary pendent sleeve A$^2$ in which rotates the sleeve B' of the turn-table. This long bearing is to secure accuracy in the moving parts. The turn-table B has in its upper face a series of die seats $b$, which receive the metal bottle caps to be re-shaped and on the upper end of the stem C is mounted a cross head D which at its opposite ends on the under side carries two dies $x$ and $y$ adapted to enter the die seats when the head is brought down by the treadle. One of these dies $x$ re-shapes the second-hand bottle caps, and the other one $y$ forces into the re-shaped cap one of the cork disks $z$ taken from a vertical magazine I by a reciprocating feeder bar R having forked end $r$, Fig. 3.

Referring now to Fig. 2, the plunger head D is connected by a link J with the arm K of an elbow lever fulcrumed at $k$ to a stationary standard and having its other arm K' descending to and grasping in its fork a laterally projecting pin L. This pin is attached to a horizontal reciprocating bar M, Fig. 3, sliding in the part A' of the bed. On the rear end of the bar M is fulcrumed at $m$ a short lever N, one end Q of which is formed as a mutilated gear engaging teeth $t$ on the cork disk feeder R and the other end of which is slotted at O to receive a pin P mounted on top of slide M.

The inner end $m^2$ of the bar M, see Figs. 1 and 3$^a$, is formed into a locking detent which enters one of a series of notches $d$, Fig. 2, in the edge of the turn-table, which are spaced a distance apart corresponding to the space between the die seats, so as to stop the turn-table with two of its die seats immediately below the dies $x$ and $y$ of the plunger head. The bar M is advanced to the locking position when the plunger rises. When the plunger descends the elbow lever K K' forces the bar M back. This latter movement causes slide M and pin P to force back the connected end of lever N, while the toothed end Q is moved forwardly with the disk feeder R and the forked end $r$ of the disk feeder, which is a little less than the thickness of the disk, and forces a cork disk out of the magazine and directly over the die seat below the die $y$, as seen in dotted lines at $z'$ in Fig. 1. Then when the plunger and head come down, the die $y$ forces the cork disk into the bottle cap which is resting in the die seat. When the disk feeder is thus advanced it must stop for a moment, while the die is going to its lowest point, and for this purpose the slot O in lever N is made with an angular bend, so that when cork feeder R has been advanced to feed a cork, as in Fig. 3$^a$, the outer angular end of the slot O is thrown into the longitudinal alinement of the travel of pin P and the latter is free to move outwardly in the same, as indicated by the dotted lines in Fig. 3$^a$, without moving the cork feeder R. During this stationary interval of cork feeder R the dies $x$—$y$ complete their descent to force the cork into one cap and swage the other.

After the downward movement of the dies is completed and they start to rise, see Fig. 2, elbow lever K K' is rocked in the reverse direction and a hooked spring pawl C² mounted on a post $p$ on bar M is forced by spring $u$ into a ratchet wheel B² on top of the turn-table and as the pawl advances it turns the ratchet wheel and turn-table the space of one die seat, the end $m^2$ of the bar M at the last part of the movement entering one of the notches $d$ in the turn-table and fixing its position for the next descent of the plunger. When the cap has had the cork thus placed in it, the cap with its cork is lifted out and discharged as follows. On the top of the bed A is a small cam $e$, shown in curved dotted lines in Fig. 3ª, and in sectional detail in Fig. 6. In each die seat there is a small plunger $b'$ and as the turn-table carries this plunger over the cam $e$ the latter forces up the plunger and lifts the cap above the surface of the turn-table, and as the latter turns further a stationary scraper arm $s$ sweeps off the cap from the table into any suitable receptacle.

The dies $x$ for re-shaping may be made in various shapes, but they all have a spring seated push-off center for discharging the cap and keeping it from hanging on the swaging die. This push-off center may be made as in Fig. 7 with a headed plunger $x'$ having spiral spring $x^3$ above it, or it may be as in Fig. 8, with a plunger $x$ having a spiral spring above it and a retaining pin and slot, or it may be made as in Fig. 9 with a larger plunger $x^4$ and a spiral spring $x^5$ entering a chamber in the same and having two retaining pins and slots.

As the cross head D moves up and down it is guided and steadied for accurate registration with the subjacent die seats, and for this purpose, see Figs. 1 and 5, a small fin or rib $f$ is formed on the end of the cross head and this is received into a vertical slot or channel in the magazine I.

As the cork disks are very light it is necessary to secure a more positive downward feed than is furnished by their own gravity. For this purpose I employ a superposed weight $w$ on top of the stack of disks as seen in Fig. 1. This overcomes any tendency of the disks to hang from friction in the magazine and thus positively and accurately brings the bottom disk into the plane of action of its reciprocating feed bar R.

The operation of re-shaping the caps is as follows: The old caps are fed into the die seats just to the right of the stripper bar $s$, seen in Fig. 2. The next movement of the turn-table brings a cap under the swaging die $x$. After all the die seats around to the cork magazine have become thus filled with swaged or re-shaped caps, the next movement of the turn-table brings one of these re-shaped caps under the die $y$ and a cork disk is forced out by feeder R and is pressed down by the die $y$ into one crown cap at the same time that die $x$ re-shapes another cap on the opposite side. Then as the table turns again the dislodging plunger $b'$ rides up on the cam $e$ and lifts the cap up so that it may be swept off by the stripper $s$. It is important that the swaging die $x$ should be so formed that it will not mutilate or destroy the little knob points of which there is in the bottle cap a circular series for subsequent fastening on to the bottle neck. I use for this purpose a smooth plunger die that does not destroy the knob points, instead of a fluted die, as the fluted die could not be used because the knob points are not of uniform size, and my smooth die is so shaped that the swaging is done, as stated, so as not to mutilate or destroy the knob points.

An important feature of my invention consists in mounting the swaging die and the cork-inserting plunger on the cross head on opposite sides of the vertical reciprocating stem, so that both enter the seats in the subjacent turntable at the same time for double action. This not only balances the strain on the cross head, but the die and the plunger co-operate reciprocally, each helping the other to insure its accurate registration with the seats in the subjacent turn table; that is to say, the penetration of the swaging die into its seat insures the registration of the plunger with its diametrically opposite seat. Furthermore this arrangement gives a proper interval of space on the turn-table for applying and removing the caps between the two operations and as two operations are performed at each descent of the cross-head the efficiency of the machine is increased.

Although I have shown my machine as operated by a treadle, I would have it understood that it is also designed to be run by a power appliance through a belt, or it may be driven by a motor connected to the machine.

I claim

1. A machine for repairing sheet metal bottle caps, comprising a turn-table with die seats in its upper face and a downwardly projecting tubular bearing in the center, a bed with a downwardly projecting sleeve embracing the tubular bearing of the turn-table, a central stem arranged to reciprocate vertically in the tubular bearing of the turn-table and carrying at the top a cross head having on one end a swaging die and on the other end a plunger, and means for feeding an elastic disk between the plunger and turn-table.

2. A machine for repairing sheet metal bottle caps, comprising a turn-table with die seats, a vertically reciprocating stem bearing a cross head having on one end a swaging die and on the other end a plunger, means for feeding an elastic disk between the plunger and turn-table, a subjacent bed having a sleeve bearing for the center of the turn-table and a raised outer edge for supporting the edge of the turn-table.

3. A machine for repairing sheet metal bottle caps, comprising a turn-table with die seats, a vertically reciprocating stem bearing a cross-head having a swaging die on one end and a plunger on the other, a device for feeding an elastic disk between said plunger and turn-table, and means for maintaining said feed device stationary during the last part of the descent of the die and plunger.

4. In a machine of the kind described, the combination of a turn-table having die seats and means for rotating it intermittently, a magazine for elastic disks, a horizontal feed bar for said disks playing under the magazine and having rack teeth along its side, a lever with segment teeth on one end engaging said rack teeth and an angular slot at the other end, a sliding carrier block with pin playing in said slot, means for reciprocating said carrier block and a vertical plunger for transferring the elastic disks to the die seats.

5. In a machine of the kind described, the combination of a turn-table having die seats and a centrally arranged ratchet wheel, a magazine for elastic disks, a horizontal feed bar for said disks playing under the magazine and having rack teeth along its side, a lever with segment teeth on one end engaging said rack, and an angular slot at the other end, a sliding carrier block with pin playing in said slot, means for reciprocating said carrier block, a spring pawl attached to said block and engaging the ratchet wheel of the turn-table, and a vertical plunger for transferring the elastic disk to the die seats.

6. In a machine of the kind described, the combination of a turn-table having die seats and means for rotating it intermittently, a vertical magazine for elastic disks, a horizontal feed bar for the disks, a vertical plunger for transferring the disk to the die seat and an elbow lever with link connecting one of its arms to the vertical plunger and having its other arm connected to and actuating the feed bar of the magazine.

7. In a machine of the kind described, the combination of a turn-table having die seats and a central ratchet wheel, a vertical magazine for elastic disks, a horizontal feed bar for the disks, a vertical plunger for transferring the disks to the die seats, an elbow lever with link connecting one arm to the vertical plunger and having its other arm connected to a sliding block, said block being connected to the disk feed bar and carrying also a spring pawl engaging the ratchet wheel of the turn-table.

8. In a machine of the kind described, the combination with a turn-table having die seats, of a central reciprocating stem bearing a cross head having a guide rib, and a vertical magazine having a guide channel receiving the guide rib of the cross head.

GEORGE G. GLENN.

Witnesses:
A. G. MYERS,
ELI KENDRICK.